US009265084B2

(12) United States Patent
Khay-Ibbat

(10) Patent No.: US 9,265,084 B2
(45) Date of Patent: Feb. 16, 2016

(54) DATA BUFFERING BASED ON ACCESS STRATUM CONDITIONS IN A CALL HAVING BOTH CIRCUIT-SWITCHED AND PACKET-SWITCHED COMPONENTS

(75) Inventor: Samy Khay-Ibbat, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 550 days.

(21) Appl. No.: 13/610,786

(22) Filed: Sep. 11, 2012

(65) Prior Publication Data

US 2014/0071888 A1 Mar. 13, 2014

(51) Int. Cl.
*H04W 80/04* (2009.01)
*H04W 76/02* (2009.01)

(52) U.S. Cl.
CPC .......... *H04W 76/028* (2013.01); *H04W 76/026* (2013.01)

(58) Field of Classification Search
CPC ..... H04W 84/18; H04W 88/08; H04W 88/06; H04W 84/12; H04W 80/04
See application file for complete search history.

(56) References Cited

U.S. PATENT DOCUMENTS

| | | | | |
|---|---|---|---|---|
| 5,818,818 A * | 10/1998 | Soumiya et al. | | 370/252 |
| 6,185,221 B1 * | 2/2001 | Aybay | | 370/412 |
| 7,318,187 B2 | 1/2008 | Vayanos et al. | | |
| 7,606,190 B2 * | 10/2009 | Markovic et al. | | 370/328 |
| 8,141,120 B2 * | 3/2012 | Zhang et al. | | 725/96 |
| 8,702,250 B2 * | 4/2014 | Raz et al. | | 359/843 |
| 2003/0133408 A1 * | 7/2003 | Cheng et al. | | 370/230 |
| 2006/0007862 A1 * | 1/2006 | Sayeedi et al. | | 370/235 |
| 2006/0176907 A1 * | 8/2006 | Takeda | | 370/468 |
| 2007/0213038 A1 | 9/2007 | Masseroni et al. | | |
| 2007/0249390 A1 * | 10/2007 | Purkayastha et al. | | 455/552.1 |
| 2007/0280256 A1 * | 12/2007 | Forslow | | 370/395.2 |
| 2009/0193484 A1 * | 7/2009 | Zhang et al. | | 725/112 |
| 2009/0258647 A1 * | 10/2009 | Yamada et al. | | 455/435.1 |
| 2011/0124294 A1 | 5/2011 | Dwyer et al. | | |
| 2011/0189971 A1 * | 8/2011 | Faccin et al. | | 455/404.1 |
| 2012/0015620 A1 * | 1/2012 | Ueda et al. | | 455/404.1 |
| 2012/0064908 A1 * | 3/2012 | Fox et al. | | 455/452.2 |
| 2012/0149382 A1 * | 6/2012 | Fox et al. | | 455/445 |
| 2012/0250644 A1 * | 10/2012 | Sambhwani et al. | | 370/329 |
| 2012/0307721 A1 * | 12/2012 | Jong et al. | | 370/316 |
| 2013/0003542 A1 * | 1/2013 | Catovic et al. | | 370/230 |
| 2013/0016601 A1 * | 1/2013 | Patil et al. | | 370/216 |
| 2013/0128752 A1 * | 5/2013 | Singh et al. | | 370/252 |
| 2013/0258512 A1 * | 10/2013 | Raz et al. | | 359/843 |
| 2013/0267240 A1 * | 10/2013 | Fu | | 455/452.2 |
| 2014/0051454 A1 * | 2/2014 | Wirtanen et al. | | 455/452.1 |

\* cited by examiner

*Primary Examiner* — Hassan Phillips
*Assistant Examiner* — Prenell Jones
(74) *Attorney, Agent, or Firm* — Meyertons Hood Kivlin Kowert & Goetzel, P.C.; Jeffrey C. Hood

(57) ABSTRACT

Data buffering based on access-stratum conditions by a wireless user equipment (UE) device. A call may be established with a network via a wireless link. The call may include a circuit-switched component and a packet-switched component. It may be determined that the packet-switched component has been released by the network. The UE may have packet data for transmission to the network when the packet-switched component is released. The packet data may be buffered based on determining that the packet-switched component has been released by the network.

20 Claims, 4 Drawing Sheets

DATA BUFFERING BASED ON ACCESS STRATUM CONDITIONS IN A CALL HAVING BOTH CIRCUIT-SWITCHED AND PACKET-SWITCHED COMPONENTS

FIELD

The present application relates to wireless devices, and more particularly to a system and method for performing data buffering based on access stratum conditions in a call having both circuit-switched and packet-switched components.

DESCRIPTION OF THE RELATED ART

Wireless communication systems are rapidly growing in usage. Further, wireless communication technology has evolved from voice-only communications to also include the transmission of data, such as Internet and multimedia content. Many wireless communication systems provide packet-switched services, circuit-switched services, or even both circuit-switched services and packet-switched services.

In wireless communication systems which provide both circuit-switched services and packet-switched services, such as UMTS, it may be possible for a wireless device to establish a call having both circuit-switched and packet-switched components, for example, in order to provide voice and data services simultaneously. However, in some circumstances access stratum (e.g., wireless medium) difficulties cause difficulties in the packet-switched part of the call, which could lead to dropping of the entire call, including the circuit-switched part.

Improvements have been suggested for network infrastructure, such that these difficulties might be detected, in which case the network could release just the packet-switched (e.g., data) component of such a call in an attempt to at least save the circuit-switched (e.g., voice) component of the call.

However, even if such improvements are implemented, if the wireless device immediately attempts to re-establish the packet-switched component of the call (e.g., as a result of packet-switched data waiting to be transmitted), this may still lead to dropping of the entire circuit-switched and packet-switched call. Accordingly, improvements in wireless communications would be desirable.

SUMMARY OF THE DISCLOSURE

In light of the foregoing and other concerns, it would be desirable to provide a way for wireless user equipment (UE) devices participating in circuit-switched (CS) and packet-switched (PS) calls to more sensitively manage the PS components under poor access-stratum (e.g., radio access) conditions. In particular, it would be desirable for a UE to detect conditions indicating that access stratum conditions are poor, and to moderate and/or curtail the PS component of a CS and PS call in response to such conditions. This may be accomplished by at least temporarily buffering uplink packet data in response to detecting poor access stratum conditions in CS and PS calls rather than trying to immediately push through such uplink packet data in spite of the poor access stratum conditions.

There are numerous possible indications of access stratum condition quality. For example, if the network to which the UE is connected releases the PS component of a CS and PS call, this may be one possible indication of poor access stratum conditions. Another possible indication is if the PS component is technically established, but is in a special state in which no data can be transmitted (e.g., a 0/0 state).

In addition to such external (e.g., controlled by the network) conditions, the UE may be able to detect certain indicators of poor access stratum conditions based on local conditions. For example, these indicators may include: 1) the UE has been transmitting at a maximum power level for a certain period of time, 2) transmit power commands received from the network have requested increased transmit power for a certain amount of time, or 3) the UE's attempts to respond to network status polls have been unsuccessful for a certain amount of time. If any one or more of the above 3 indicators occurs, the UE may consider this an indication that access stratum conditions are poor. In such cases, the UE may determine that it is in a state (e.g., a "bad" or "vulnerable" state) substantially corresponding to poor access stratum conditions.

Similarly, the UE may also be able to detect certain indicators of adequate access stratum conditions based on local conditions. For example, if the UE is not transmitting at a maximum power level, and/or if a signal-to-interference-estimate (SIRE) approximately (or exactly) matches with a signal-to-interference-target (SIRT) for a certain amount of time, the UE may consider this an indication that access stratum conditions are adequate. In such cases, the UE may determine that it is in a state (e.g., a "good" or "normal" state) substantially corresponding to adequate or good access stratum conditions. Note that the UE may implement a hysteresis between the good/normal state and the bad/vulnerable state, in order to avoid rapid switching between states.

If access stratum conditions are poor in a CS and PS call, e.g., as might be detected by a UE based on any of the above-described indications, it may be desirable for the UE to at least temporarily avoid using the PS component of the CS and PS call. Thus, the UE may store any upper layer data for transmission to the network via the PS component in its buffers until access stratum conditions improve.

For example, if access stratum conditions are poor in a CS and PS call, the network may sometimes release the PS component in an attempt to at least save the CS component of the call. If this occurs, and the UE also detects one or more local indications of poor access stratum conditions, the UE may delay or altogether avoid attempting to re-establish the PS component of the call. The amount of delay before (and/or the decision to avoid) attempting to re-establish the PS component of the call may further depend on quality of service (QoS) requirements and/or other priority information relating to the packet data waiting to be transmitted. For example, the UE might initiate a timer (whose length may depend on the QoS requirements of the buffered packet data), and waiting until for access stratum conditions to improve, or for the timer to expire, before attempting to re-establish the PS component (or possibly discarding the packet data, e.g., if it is not high-priority data and access stratum conditions have not improved).

Thus, by temporarily buffering uplink packet data under poor access stratum conditions in a CS and PS call, the UE may have a greater chance of retaining the CS component of the call. Since the CS component of a CS and PS call may (at least in some cases) be used for transport of the highest priority data (e.g., voice data), this may generally be desirable. Furthermore, by utilizing QoS or other priority information relating to packet data, the UE may be able to further adjust to what degree to moderate the PS component of the CS and PS call under such circumstances, in order to provide the best possible user experience to a user of the UE in any particular set of access stratum conditions.

Accordingly, embodiments are presented herein of such a method for buffering uplink packet data based on access stratum conditions in a CS and PS call, and a UE configured to implement the method. The UE may include one or more radios, including one or more antennas, for performing wireless communications with base stations (BSs). The UE may also include device logic (which may include a processor and memory medium and/or hardware logic) configured to implement the method. Embodiments are also presented of a memory medium (e.g., a non-transitory computer accessible memory medium) storing program instructions executable by a processor to perform part or all of the method.

BRIEF DESCRIPTION OF THE DRAWINGS

A better understanding of the present subject matter can be obtained when the following detailed description is considered in conjunction with the following drawings.

DETAILED DESCRIPTION OF THE EMBODIMENTS

Acronyms

Figure 1:
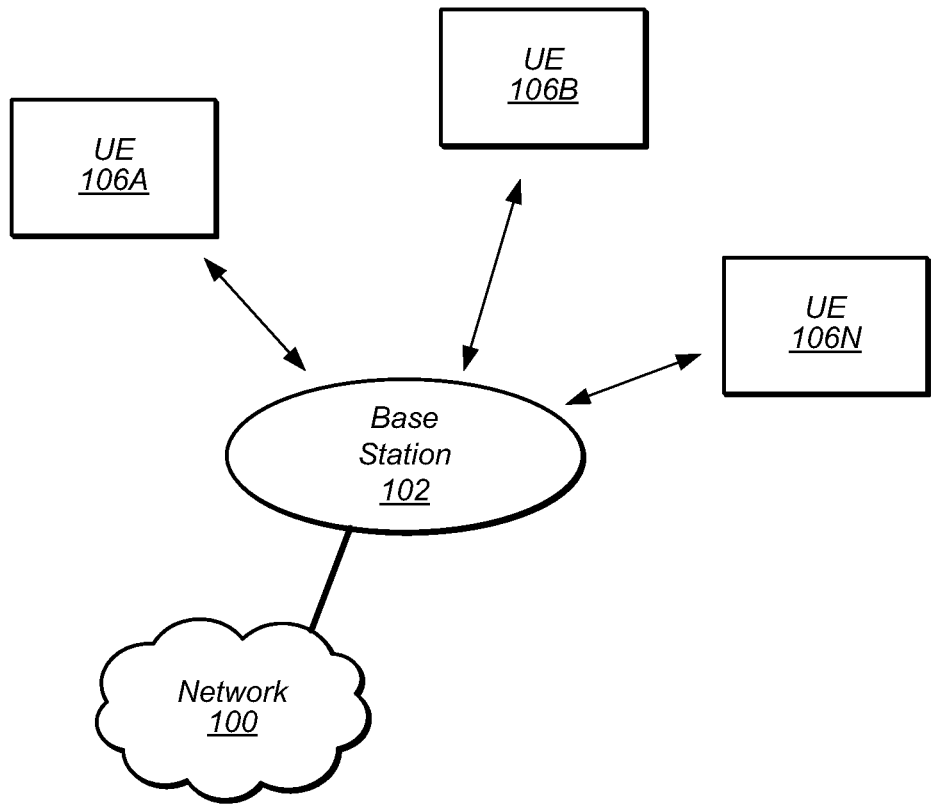
FIG. 1 illustrates an exemplary (and simplified) wireless communication system.

The following acronyms are used in the present Patent Application:
UE: User Equipment
BS: Base Station
GSM: Global System for Mobile Communication
UMTS: Universal Mobile Telecommunication System
LTE: Long Term Evolution
CS: Circuit-switched
PS: Packet-switched
RAB: Radio Access Bearer
mRAB: Multiple Radio Access Bearer
SIRE: Signal to Interference Ratio Estimate
SIRT: Signal to Interference Ratio Target
RLC: Radio Link Control Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android·-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
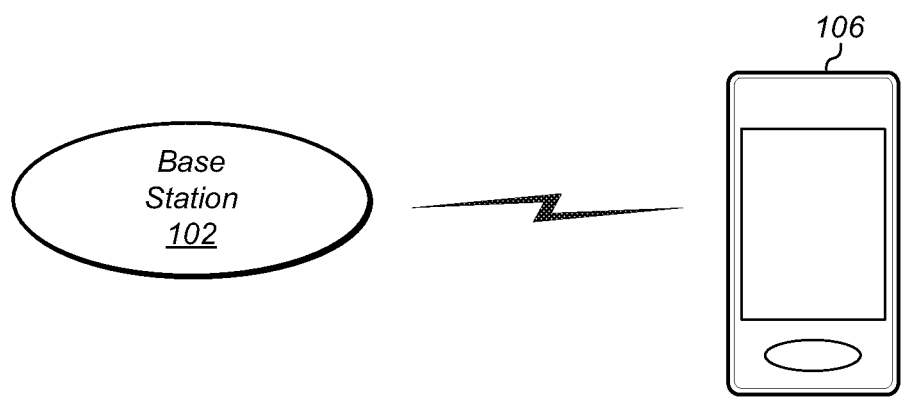
FIG. 2 illustrates a base station in communication with user equipment.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100. Thus, the base station 102 may facilitate communication between the UEs and/or between the UEs and the network 100. The communication area (or coverage area) of the base station may be referred to as a "cell." The base station 102 and the UEs may be configured to communicate over the transmission medium using any of various wireless communication technologies such as GSM, CDMA, WLL, WAN, WiFi, WiMAX, etc. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

UE 106 may be capable of communicating using multiple wireless communication standards. For example, the UE 106 might be configured to communicate using two or more of GSM, UMTS, CDMA200, WiMAX, LTE, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of UMTS, CDMA 2000, LTE, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or 1xRTT, and separate radios for communicating using each of Wi-Fi and Bluetooth. Other configurations are also possible.

The UE 106 may be configured to buffer packet data based on access stratum conditions. For example, the UE 106 might be configured to communicate using a wireless communication technology which provides packet-switched (PS) services and circuit-switched (CS) services. If the UE 106 has established a CS and PS call and access stratum conditions become degraded, the PS part of the call may be dropped, and rather than immediately attempting to re-establish the PS part of the call, the UE 106 may buffer any uplink packet data waiting to be transmitted, at least temporarily. In this way, the UE 106 may advantageously avoid causing the entire call to drop in unfavorable access stratum conditions.

Figure 3:
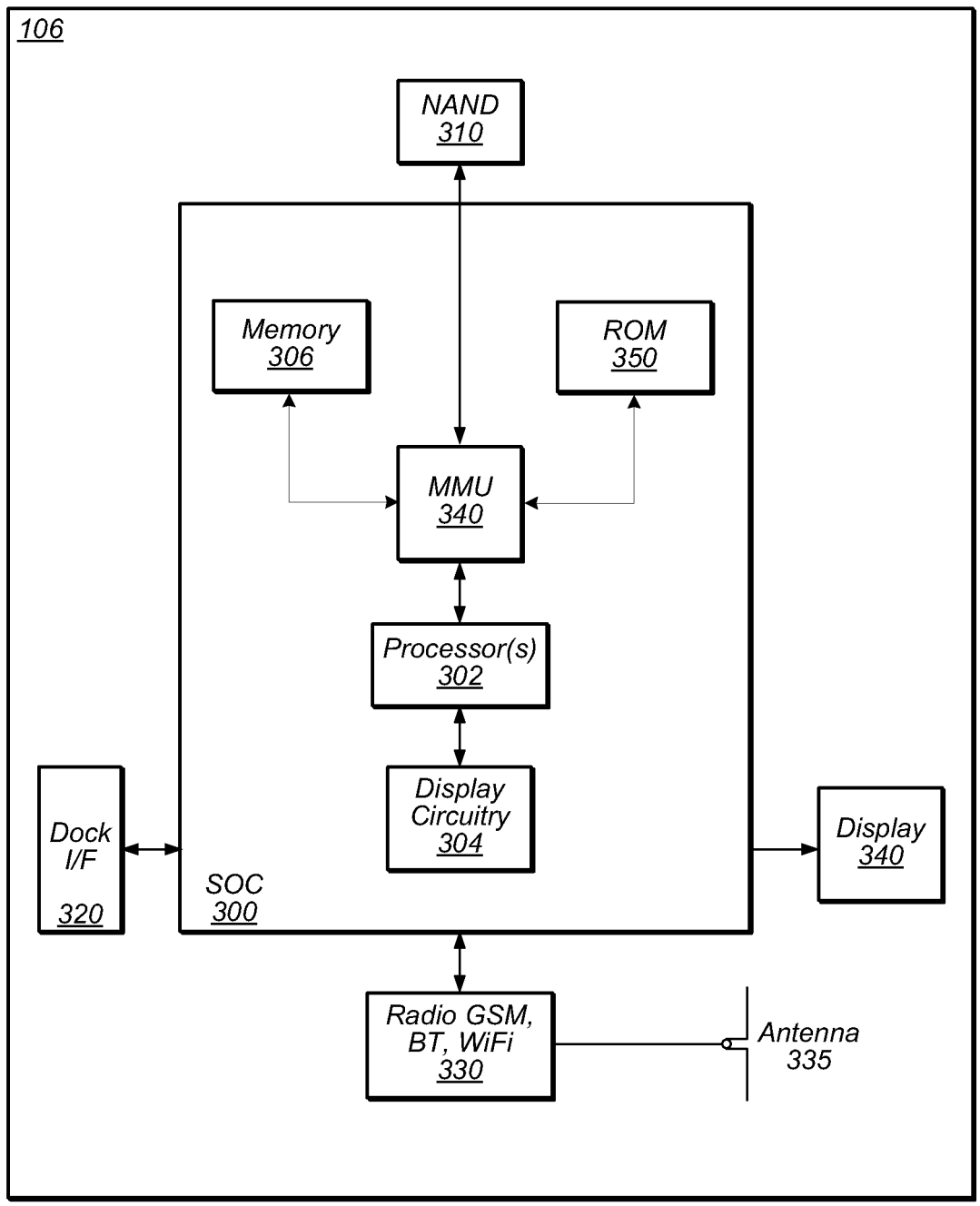
FIG. 3 illustrates an exemplary block diagram of a UE, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

As shown in FIG. 3, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, CDMA2000, Bluetooth, WiFi, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards.

Figure 4:
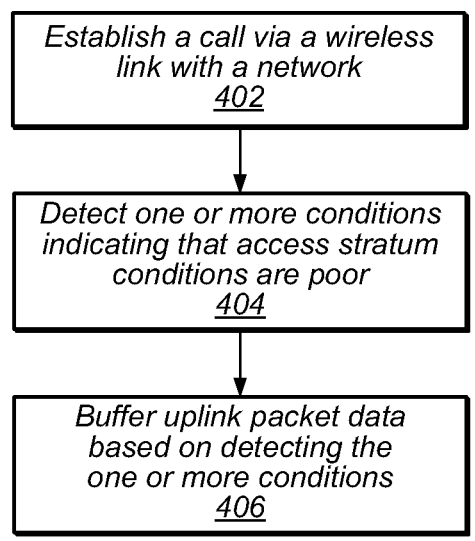
FIGS. 4-5 are flowchart diagrams illustrating embodiments of a method for buffering uplink packet data based on access stratum conditions While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

As described herein, the UE 106 may include hardware and software components for implementing a method for buffering packet data based on access stratum conditions according to embodiments of this disclosure. FIG. 4 and the description provided with respect thereto relate to one such method according to one set of embodiments.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 5:
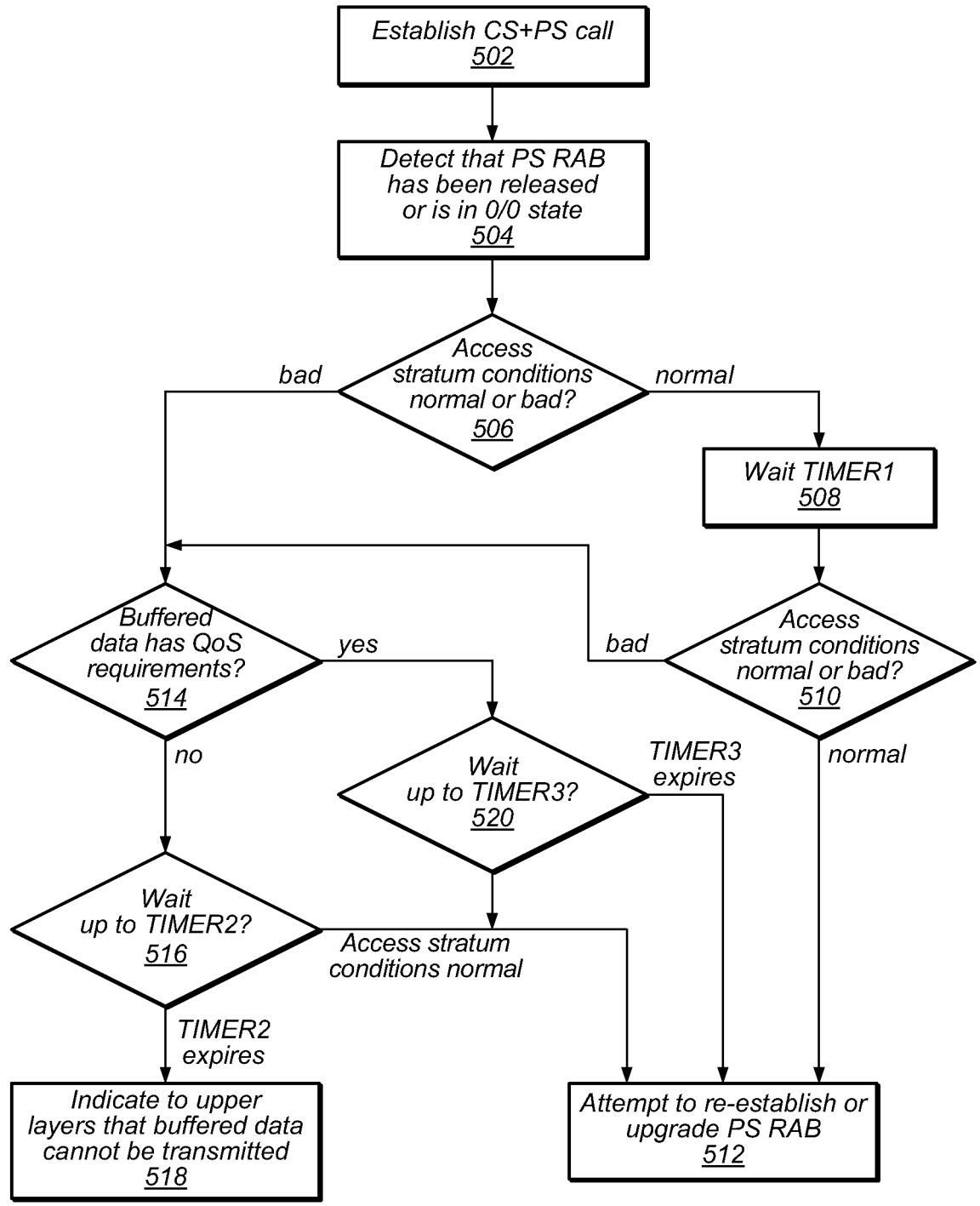

FIGS. 4-5—Flowcharts

A circuit-switched (CS) connection ensures a dedicated connection between a transmitter and receiving device, generally in order to provide quality of service sufficient for a voice call. In cellular communications, the receiving and transmitting devices are generally a UE device (such as UE 106) and a BS (such as BS 102).

A packet-switched (PS) connection provides for transmission of discretely sized packets of data between a transmitter and receiving device, generally with variable delay and throughput, e.g., depending on the traffic and/or other factors. PS connections are often used for networking applications executing on a UE device (such as UE 106), such as web browsers, email applications, and/or any other type of application that uses a network connection for transmitting and/or receiving data.

According to some cellular technologies, such as UMTS, it may be possible to simultaneously provide both a CS connection and a PS connection between UE 106 and BS 102. This may be provided via a CS and PS call, for example, in which separate CS and PS radio access bearers (RABs) are established, such that CS services are provided via the CS RAB(s) and PS services are provided via the PS RAB(s). This may, for example, allow a user to participate in a CS voice call while at the same time utilizing a web browsing or other application which uses a PS data connection. Other uses of CS and PS calls are also possible.

In a cellular communication system, access stratum conditions (e.g., radio/wireless medium conditions) may generally be variable. For example, depending on line-of-sight obstacles, antenna position (e.g., due to user grip or other positioning of the UE 106), moving conditions, distance from a serving base station, interference from other base stations, and/or any of various other factors, UE 106 may have a better or worse quality connection to the network at any given time. Note that in some cases, access stratum conditions may be degraded for just PS RAB(s) or just for CS RAB(s)

If conditions are sufficiently degraded, the access stratum may not be capable of supporting all of the services which have been established. For example, if sufficiently poor access stratum conditions (at least with respect to PS RAB(s)) exist in a CS and PS call, it may be possible that the entire call is dropped (e.g., the connection between the UE 106 and the BS 102 is released). In order to avoid this, some networks may drop just the PS part of the call (e.g., may release the PS RAB(s)) upon detecting degraded access stratum conditions in a CS and PS call.

Without the PS part of the call to support, the UE 106 and the BS 102 may have more resources available to support the CS part of the call, which may improve the chances that the CS part of the call remains connected despite the access stratum difficulties. However, if the UE 106 were to immediately try to re-establish the PS part of the call (as might be desirable if the PS RAB were released under other circumstances, such as in normal or good access stratum conditions), this might again draw UE 106 and/or BS 102 resources away from the CS part of the call (e.g., for additional PS re-establishment related signaling procedures). Not only is it possible that such attempted re-establishment of PS RABs could itself fail, but also it might result in loss of the entire call, including both the CS and PS parts of the call.

More generally, it is possible that a CS and PS call may be in danger of being dropped in poor access stratum conditions even if the BS 102 does not release the PS RAB(s). Accordingly, if access stratum conditions are poor, it may be desirable for the UE 106 to detect when poor access stratum conditions exist, either based on external indicators such as network-based dropping of PS RAB(s), or based on internal indicators of poor access stratum conditions such as high and/or increasing transmission power being required over an extended period of time, or both. If poor access stratum conditions are detected during a CS and PS call, it may be desirable for the UE 106 to avoid using PS services, for example by buffering any uplink data packets configured for packet-switched transmission, at least for a period of time.

Accordingly, FIG. 4 is presented as a flowchart diagram illustrating a method for buffering uplink packet data based on access stratum conditions which may be performed by a UE device 106. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 402, a call may be established via a wireless link with a network. The wireless link may operate according to any of various wireless technologies. In some embodiments, the wireless link may be a cellular link according to a cellular technology. The wireless link may be between the UE 106 and a BS 102; the BS 102 may provide a connection to a core network, e.g., of a cellular service provider. The base station 102 may operate in conjunction with numerous other base stations (which may provide other cells) and other network hardware and software to provide continuous (or nearly continuous) overlapping wireless service over a wide geographic area.

The BS 102 may provide a cell which serves the UE 106 and provides a connection to the core network via the first wireless link, and as such may act as the "serving" cell for the UE 106. There may also be one or more "neighboring" cells (e.g., for providing the above-described continuous or nearly continuous overlapping wireless service), provided by nearby base stations, with which the UE 106 may be capable of discovering, detecting signals from, and possibly communicating (e.g., depending on signal strength, etc.), but with which the UE 106 may not have an active wireless link. It is possible that one or more of the neighboring cells may operate according to different wireless technologies than BS 102. Some or all of the neighboring cells may be operated by the same wireless service provider which operates the first cell, and may also provide a communicative connection to the core network (or to a core network according to the wireless technology of the respective cell, which may be a different wireless communication technology).

The call may be a multiple radio access bearer (mRAB) call. For example, the call may include a CS component (e.g., one or more CS RABs) and a packet switched PS component (e.g., one or more PS RABs); thus, establishing the call may include establishing a CS RAB and establishing a PS RAB. Establishing the RABs may include establishing radio link control (RLC) entities for each RAB, and/or any of various other link establishment procedures. For example, the call may be established according to UMTS, e.g., using a combined-attach request and similar procedures, if desired, or may be established according to a different wireless communication protocol which supports calls having CS and PS components.

In 404, one or more conditions indicating that access stratum conditions are poor may be detected. As noted above, if access stratum (e.g., radio/wireless medium) conditions become degraded during the course of a CS and PS call, it is possible that the entire call may be dropped. The conditions, or indications, or poor access stratum conditions may be any of various possible conditions, and may include indicators which are generated or detected internally by the UE 106, and/or indicators which are generated externally of the UE 106 (e.g., by network infrastructure, which could include BS 102 and/or one or more higher level network entities, among other possibilities).

Some factors which may be considered external indicators of poor access stratum conditions could include release of the PS RAB(s) by the network, or assignment of a non-data-bearing PS RAB (e.g., a 0/0 PS RAB) by the network. Such factors may be considered "external" because they may be controlled by the network. The network may determine to release the PS RAB or assign a 0/0 PS RAB based on indications of poor access stratum conditions between the UE 106 and BS 102 available to the network (e.g., generated and/or detected by the BS 102). For example, the network may release the PS RAB or assign the UE 106 a 0/0 PS RAB based on one or more of signal to noise ratio (SNR), signal to interference plus noise ratio (SINR), signal to interference ratio estimates (SIREs) and/or targets (SIRTs), transmit power control (TPC) commands/estimates of transmit power used by the UE 106, or any other of a variety of possible indicators, possibly including one or more combinations and/or comparisons of indicators (e.g., a SIRT/SIRE comparison).

Note that in some situations, events which may function as external indicators of poor access stratum conditions may be caused by factors other than poor access stratum conditions. For this reason, it may be desirable for the UE 106 to also track internal indicators of access stratum conditions, e.g., to determine internally whether the UE 106 considers itself to be operating in "normal"/"good" access stratum conditions or "poor"/"degraded"/"bad" access stratum conditions.

Accordingly, the UE 106 may also monitor internal conditions for indications of whether the UE 106 is operating in normal or poor access stratum conditions. The UE 106 may also determine (e.g., at any given time) whether the UE 106 is operating in an "normal" (or "adequate" or "good") state or in a "bad" (or "degraded" or "poor") state with respect to access stratum conditions, where the "bad" state substantially corresponds to poorer access stratum conditions than the "good" state.

Some factors which may be considered internal indicators of poor access stratum conditions may be factors relating to transmit power used by the UE or success/failure rate of transmissions. For example, if the transmit power of the UE is at a maximum level for more than a certain (e.g., predefined/predetermined) amount of time, this may be detected as an indication that access stratum conditions are poor. As another example, if the transmit power of the UE has increased continuously (e.g., every transmit power control (TPC) command has requested an increase in transmit power) for a certain (e.g., predefined/predetermined) amount of time, this may be detected as an indication that access stratum conditions are poor. A further example of an indication that access stratum conditions are poor could include if the attempts by the UE 106 to respond to network status polls have failed/been unsuccessful (e.g., if a PS radio link control (RLC) entity on the UE 106 is unable to acknowledge or respond to status polls received from the network) for a certain (e.g., predefined/predetermined) amount of time. Other internal indicators of (or conditions corresponding to) poor access stratum conditions are also possible. Note that the length of time for which each of the above described conditions must occur to be detected as an indicator of poor access stratum conditions may be any length of time, as desired, and may be the same or different for each above described condition. As one example, the length of time for each condition may be 5 seconds, though other values (e.g., 3 s, 6 s, 10 s, etc.) are also possible. If one or more of the above-described conditions are true, it may be determined that the UE 106 is operating in a "bad" state with respect to access stratum conditions.

One possible set of conditions which may be considered an internal indicator of normal access stratum conditions could include if the UE 106 is not transmitting at a maximum power level and/or if a signal-to-interference-ratio estimate (SIRE) matches (e.g., approximately or exactly) a signal-to-interference-ratio target (SIRT) for a certain (e.g., predefined/predetermined) amount of time. The length of time for which SIRE must match SIRT to be detected as an indicator of adequate access stratum conditions may be any length of time, as desired. As one example, the length of time may be 5 seconds, though other values (e.g., 3 s, 6 s, 10 s, etc.) are also possible. Note that other internal indicators of (or conditions corresponding to) adequate or normal access stratum conditions are also possible. If conditions indicative of normal access stratum conditions are detected, it may be determined that the UE 106 is operating in a "normal" state with respect to access stratum conditions.

Note that a hysteresis applied between the "normal" state and the "bad" state. For example, the conditions which may be used as triggers for switching from "normal" to "bad" or from "bad" to "normal" may be defined for UE 106 in a manner such that there may be a gap between those conditions. In other words, it is possible that at certain times the UE 106 could experience access stratum conditions which could be considered either "bad" or "normal" according to the configuration of the UE 106, and the UE 106's determination of which of those states it is in at any such time may be partially based on past access stratum conditions (e.g., past changes in access stratum conditions). Using a hysteresis in implementing determination of states with respect to access stratum conditions may advantageously may prevent the UE 106 from rapidly switching between states.

At the time that the one or more conditions indicative of poor access stratum conditions are detected, or possibly at some time thereafter (e.g., at which access stratum conditions remain poor), the UE 106 may have packet data (e.g., one or more data packets such as application data packets) waiting for uplink transmission to the network via the wireless link (e.g., via a PS RAB), which may also be referred to as uplink packet data. The packet data may have been generated by and/or received from one or more upper layer entities executing on the UE 106. For example, the packet data may have been generated by and received from an application (e.g., a web browsing application, a game application, an email application, or any other application that utilizes a network connection) executing at an application layer on the UE 106. The packet data may be low, normal, or high priority, or any other priority according to various measures of data priority. For example, the packet data may have Quality of Service (QoS) requirements (or a higher level of QoS requirements), which may function as an indicator of high priority, or may not have QoS requirements (or a lower level of QoS requirements), which may function as an indicator of normal or low priority. Another possible indicator could include whether the uplink data is user-initiated (e.g., if an explicit command has been received from a user to transmit the uplink data, in which case the uplink data might be considered high priority) or if the uplink data is non-user-initiated (e.g., if the uplink data is part of an automatic or background data transfer, in which case the uplink data might be considered low or normal priority). Any of various other indicators and levels of priority are also possible.

In 406, the uplink packet data may be buffered based on detecting the one or more conditions indicative of poor access stratum conditions. The uplink packet data may be buffered for a certain amount of time, after which an attempt may be made to transmit the buffered uplink packet data, or after which the buffered uplink packet data may be discarded, e.g., depend on one or more of any number for factors. For example, the length of time for which the uplink packet data is buffered, and the action taken subsequent to that length of time, may depend on which conditions indicative of poor access stratum conditions are detected, and possibly on whether the uplink packet data has quality of service (QoS) requirements or other indicators that the uplink packet data is high priority data.

If it is determined that the PS RAB has been released, but that the UE 106 is operating in a "normal" state with respect to access stratum conditions (e.g., internal indicators have not triggered a transition to a "bad" state with respect to access stratum conditions), the UE 106 may wait for a period of time (a "first period of time"), which may correspond to the length of a timer (a "first timer"). The UE 106 may then again determine whether access stratum conditions are normal or bad after expiration of the first timer. If access stratum conditions are (still) normal after expiration of the first timer, the UE 106 may attempt to re-establish the PS component of the call (e.g., re-establish a PS RAB), and transmit the buffered uplink data. Waiting the first period of time before attempting to re-establish the PS component of the call may help prevent call drops in cases in which the network detects poor access stratum conditions and releases the PS component of the call before the UE 106 has a chance to detect internal indicators of poor access stratum conditions. If access stratum conditions are not actually poor and the PS RAB was released for another reason, after expiration of the first timer, the UE 106 may remain in the normal state, and there may be no problem at least attempting to re-establish the PS RAB and transmitting the buffered uplink data. However, if access stratum conditions are truly poor and are the reason for release of the PS RAB by the network, after expiration of the first timer, the UE 106 may have transitioned to the bad state. Thus in such a case, buffering the uplink data temporarily may have prevented premature attempts to re-establish the PS RAB, which might endanger the entire call (including both CS and PS components) because of the poor access stratum conditions.

If it is determined that the PS RAB has been released, and that the UE 106 is operating in a "bad" state with respect to access stratum conditions (which may be determined initially or after expiration of the first timer), the UE 106 may wait up to a certain amount of time for access stratum conditions to return to the "normal" state. If it is determined that the UE 106 has transitioned to the "normal" state (e.g., if one or more indicators or conditions indicative of normal access stratum conditions) before the allotted amount of time, the UE 106 may attempt to re-establish the PS RAB and transmit the buffered uplink data.

In some embodiments, the allotted amount of time which the UE 106 may wait may depend on a priority of the buffered uplink data. Accordingly, the UE 106 may determine priority information for the buffered packet data. For example, the buffered packet data might have certain QoS requirements (e.g., indicating high priority), in which case a stronger effort to transmit the buffered packet data may be desirable. In contrast, if the buffered packet data does not have any QoS requirements (or alternatively, has low QoS requirements, e.g., indicating low priority), it may still be desirable to transmit the buffered packet data, but possibly only if doing so would not be expected to endanger the CS component of the call.

Thus, the UE 106 might wait up to a certain period of time (a "second period of time"), which may correspond to the length of a timer (a "second timer") if the packet data has a low priority (e.g., does not have QoS requirements), and may wait up to a certain (e.g., different) period of time (a "third period of time", which may correspond to the length of a timer (a "third timer") if the packet data has a high priority (e.g., does have QoS requirements). The length of the third timer may be shorter than the length of the second timer.

As noted above, the action of the UE 106 if the allotted amount of time which the UE 106 may wait may also depend on the priority of the buffered uplink data. For example, if the buffered packet data has a lower priority, upon expiration of the second timer the UE 106 may discard the buffered uplink data and/or inform one or more upper layer entities executing on the UE 106 (e.g., an application which generated the uplink data) that the uplink data has not or cannot be transmitted. In contrast, if the buffered packet data has a higher priority, the UE 106 may attempt to re-establish the PS RAB and transmit the buffered uplink data upon expiration of the third timer even though access stratum conditions may be poor, because of the high priority of the buffered uplink data. Thus, at least in some implementations, if the buffered PS data is low priority data, it may not be considered worth risking loss of the CS connection to attempt to re-establish a PS RAB, but such a risk may be considered worth taking if the buffered PS data is high priority. In other implementations, priority of the data may be given different consideration in determining whether or not, or how soon, to attempt to re-establish a PS RAB after release of the PS RAB under poor access stratum conditions, or may not be considered, as desired.

If it is determined that the UE 106 has been assigned a non-data-bearing PS RAB (e.g., a 0/0 PS RAB), and that the UE 106 is operating in a "bad" state with respect to access stratum conditions (which may be determined initially or after expiration of the first timer), the UE 106 may also wait up to a certain amount of time for access stratum conditions to return to the "normal" state. If it is determined that the UE 106 has transitioned to the "normal" state (e.g., if one or more indicators or conditions indicative of normal access stratum conditions) before the allotted amount of time, the UE 106 may attempt to upgrade the PS RAB to a data bearing state and transmit the buffered uplink data.

Much as if the PS RAB had been released, in such a situation the allotted amount of time which the UE 106 may wait may depend on a priority (e.g., as determined based on QoS requirements or otherwise) of the buffered uplink data. For example, the UE 106 might wait up to the second period of time if the packet data has a low priority, and may wait up to the third period of time, if the packet data has a high priority. Alternatively, different lengths of time (e.g., a "fourth" and a "fifth" length of time, corresponding to "fourth" and "fifth" timers) may be used if the PS RAB is non-data-bearing and access stratum conditions are poor than if the PS RAB is released and access stratum conditions are poor, if desired.

Again similarly, the action of the UE 106 if the allotted amount of time which the UE 106 may wait may depend on the priority of the buffered uplink data. For example, if the buffered packet data has a lower priority, upon expiration of the allotted amount of time may discard the buffered uplink data and/or inform one or more upper layer entities executing on the UE 106 that the uplink data has not or cannot be transmitted, while if the buffered packet data has a higher priority, the UE 106 may attempt to upgrade the PS RAB and transmit the buffered uplink data upon expiration of the third timer even though access stratum conditions may be poor, because of the high priority of the buffered uplink data. It should also similarly be noted that priority of the data may be given different consideration in determining whether or not, or how soon, to attempt to upgrade a non-data-bearing PS RAB under poor access stratum conditions, or may not be considered, as desired.

Thus, by utilizing the method of FIG. 4 as provided above according to various embodiments, a UE 106 may advantageously balance packet-switched (e.g., data) priority considerations with circuit switched (e.g., voice) priority considerations under degraded access stratum conditions in order to provide a good experience for a user of the UE 106 even under such less-than-ideal conditions.

FIG. 5 is presented as a flowchart diagram illustrating aspects of the method of FIG. 4 according to one possible implementation in further detail. While numerous specific details of the exemplary set of embodiments of FIG. 5 are provided hereinbelow by way of example, it will be recognized by those of skill in the art that any number of variations on or alternatives to the specific details of the exemplary embodiments of FIG. 5 may be implemented if desired, and that accordingly the description provided with respect thereto should not be considered limiting to the disclosure as a whole. The method may be performed as follows.

In 502, a CS and PS call may be established. The CS and PS call may be an mRAB call according to UMTS, in which a CS RAB bears CS data, while a PS RAB bears PS data.

In 504, it may be detected that the PS RAB has been released or is in a 0/0 state. The UE 106 may have PS uplink data waiting to be transmitted via a PS RAB at this time. The uplink data may be buffered (stored in a buffer).

In 506, based on detecting that the PS RAB has been released or is in a 0/0 state, it may be determined whether access stratum conditions are normal or bad (e.g., whether the UE 106 considers itself to be operating in a normal state or in a bad state with respect to access stratum conditions).

If it is determined that access stratum conditions are normal, the UE 106 may initiate a first timer ("TIMER1"), and may wait for expiration of the first timer in 508.

Upon expiration of the first timer, the UE 106 may again determine whether access stratum conditions are normal or bad in 510. If access stratum conditions are still normal, in 512, the UE 106 may attempt to re-establish the PS RAB, and/or upgrade the PS RAB assignment, e.g., depending on whether it is detected that the PS RAB has been released or is in a 0/0 state in step 504.

If access stratum conditions are bad, either when evaluated at 506 or at 510, it may be determined whether or not the buffered data has QoS requirements in 514.

If the buffered data does not have QoS requirements, the UE 106 may initiate a second timer ("TIMER2"), and may wait until access stratum conditions return to normal or until the second timer expires in 516. If the second timer expires, the buffered uplink data may be discarded/deleted and/or one or more upper layers of the UE 106 may be informed that the buffered uplink data cannot be transmitted in 518. If access stratum conditions return to normal before expiration of the second timer, the method may proceed to 512, in which the UE 106 may attempt to re-establish the PS RAB, and/or upgrade the PS RAB assignment, e.g., depending on whether it is detected that the PS RAB has been released or is in a 0/0 state in step 504.

If the buffered data does have QoS requirements, the UE 106 may initiate a third timer ("TIMER3"), and may wait until access stratum conditions return to normal or until the third timer expires in 520. If access stratum conditions return to normal before expiration of the third timer, or if the third timer expires, the method may proceed to 512, in which the UE 106 may attempt to re-establish the PS RAB, and/or upgrade the PS RAB assignment, e.g., depending on whether it is detected that the PS RAB has been released or is in a 0/0 state in step 504.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a wireless user equipment (UE) device, the method comprising:
   establishing a multiple radio bearer call via a wireless link with a network, the call having a circuit-switched radio bearer component and a packet-switched radio bearer component;
   determining that the packet-switched radio bearer component has been released by the network, wherein the UE device has packet data to be transmitted to the network when the packet-switched radio bearer component is released;
   determining that the UE device is in a first state of at least a first state and a second state with respect to RF conditions, wherein the first state substantially corresponds to poorer access stratum conditions than the second state;
   determining a Quality of Service (QoS) level of the packet data;
   selecting a buffer timer value for the packet data based at least in part on the QoS level of the packet data; and
   buffering the packet data until the earlier of expiration of the buffer timer or until the UE device enters the second state with respect to RF conditions based on determining that the packet-switched radio bearer component has been released by the network, based on determining that the UE device is in the first state with respect to RF conditions, and based on the QoS level of the packet data.

2. The method of claim 1,
   wherein the packet data is a first type of packet data, wherein the first type of packet data has a higher QoS level than a second type of packet data, wherein the selected buffer timer value is less for packet data of the first type than for packet data of the second type.

3. A wireless user equipment (UE) device, the UE device comprising:
   a radio configured to perform wireless communications;
   a processor; and
   a memory medium, comprising program instructions executable by the processor to:
      establish a circuit-switched radio access bearer, wherein the circuit-switched radio access bearer provides a circuit-switched connection to a network;
      establish a packet-switched radio access bearer, wherein the packet-switched radio access bearer provides a packet-switched connection to the network;
      determine that the packet-switched radio access bearer has been released by the network, wherein the UE device has packet data to be transmitted to the network when the packet-switched radio access bearer is released;
      determine that the UE device is in a first state of at least a first and a second state with respect to access stratum conditions, wherein the first state substantially corresponds to poorer access stratum conditions than the second state;
      determine a Quality of Service (QoS) level of the packet data;
      select a buffer timer value for the packet data based on the QoS level of the uplink packet data; and
      buffer the packet data until the earlier of expiration of the buffer timer or until determination that the UE device is in the second state with respect to access stratum conditions based on determining that the packet-switched radio access bearer has been released by the network, based on determining that the UE device is in the first state, and based on the QoS level of the packet data.

4. The UE device of claim 3, wherein the program instructions are executable to determine that the UE device is in the first state is based on detecting one or more conditions indicative of poor access stratum conditions.

5. The UE device of claim 3,
   wherein if the packet data has a first QoS level, the buffer timer has a first device timer value based on the packet data having the first QoS level;
   wherein if the packet data has a second QoS level, the buffer timer has a second device timer value based on the packet data having the second QoS level.

6. The UE device of claim 5,
   wherein the first QoS level has a higher priority than the second QoS level.

7. The UE device of claim 5, wherein the program instructions are further executable to, if the packet data has the first QoS level:
   determine that the buffer timer has expired; and
   attempt to re-establish a packet-switched radio access bearer based on determining that the buffer timer has expired and the packet data having the first QoS level.

8. The UE device of claim 5, wherein the program instructions are further executable to, if the packet data has the second QoS level:
   determine that the buffer timer has expired; and
   inform a higher layer entity that the packet data is not being transmitted based on determining that the buffer timer has expired and the packet data having the second QoS level.

9. The UE device of claim 8,
   wherein the higher layer entity is an application executing on the UE device which generated the packet data.

10. The UE device of claim 3, wherein the program instructions are further executable to:
    determine that the UE device has entered the second state; and
    attempt to re-establish a packet-switched radio access bearer based on determining that the UE device has entered the second state.

11. The UE device of claim 10, wherein the program instructions are executable to determine that the UE device has entered the second state based on detecting one or more conditions indicative of adequate access stratum conditions.

12. A non-transitory computer accessible memory medium comprising program instructions for operating a wireless user equipment (UE) device, wherein the program instructions are executable to:
    establish a multiple radio access bearer (mRAB) call via a wireless link with a network, wherein a first radio access bearer (RAB) is a circuit-switched (CS) RAB, wherein a second RAB is a packet-switched (PS) RAB;
detect one or more conditions indicative of poor wireless medium conditions;
determine a Quality of Service (QoS) level of uplink packet data configured for transmission using the PS RAB;
select a buffer timer value for the uplink packet data based on the QoS level of the uplink packet data; and
buffer the uplink packet data until the earlier of expiration of the buffer timer or detection of one or more conditions indicative of good wireless medium conditions based on detecting the one or more conditions indicative of poor wireless medium conditions and based on the QoS level of the uplink packet data.

13. The memory medium of claim 12,
wherein the one or more conditions indicative of poor wireless medium conditions comprise at least one external indicator of poor wireless medium conditions and at least one internal indicator of poor wireless medium conditions.

14. The memory medium of claim 13,
wherein the at least one external indicator of poor wireless medium conditions comprises one of:
  release of the second RAB by the network; or
  the second RAB being in a non-data-bearing state;
wherein the at least one internal indicator of poor wireless medium conditions comprises one or more of:
  transmitting at a maximum power level for at least a first amount of time;
  receiving transmit power commands from the network which request increased transmit power for at least a second amount of time; or
  failing attempts to respond to network status polls for at least a third amount of time.

15. The memory medium of claim 13,
wherein the program instructions are further configured to, if the one or more conditions indicative of poor wireless medium conditions comprise at least one external indicator of poor wireless medium conditions and at least one internal indicator of poor wireless medium conditions:
wait up to expiration of the buffer timer; and
if an internal indicator of normal wireless medium conditions is detected prior to expiration of the buffer timer, attempt to transmit the buffered packet data.

16. The memory medium of claim 13,
wherein if the buffer timer expires and the buffered packet data has a QoS level above a QoS level threshold, the program instructions are further executable to attempt to transmit the buffered packet data upon expiration of the buffer timer;
wherein if the buffer timer expires and the buffered packet data has a QoS level below the QoS level threshold, the program instructions are further executable to discard the buffered packet data upon expiration of the buffer timer.

17. The memory medium of claim 13,
wherein the program instructions are further configured to, if the one or more conditions indicative of poor wireless medium conditions comprise only an external indicator of poor wireless medium conditions:
wait until expiration of the buffer timer;
determine whether an internal indicator of poor wireless medium conditions is detected prior to expiration of the buffer timer; and
if no internal indicator of poor wireless medium conditions is detected prior to expiration of the buffer timer, attempt to transmit the buffered packet data upon expiration of the buffer timer.

18. A non-transitory computer accessible memory medium comprising program instructions executable to:
establish a call having a plurality of radio access bearers (RABs) via a wireless link with a network, wherein a first RAB of the plurality of RABs is a circuit-switched (CS) RAB, wherein a second RAB of the plurality of RABs is a packet-switched (PS) RAB;
detect that the PS RAB has been released or is in a 0/0 state, wherein packet data configured for transmission via the PS RAB is buffered upon detecting that the PS RAB has been released or is in a 0/0 state; and
determine whether access stratum conditions are good or bad;
wherein if access stratum conditions are good, the program instructions are further executable to:
  wait an amount of time of a length of a first timer;
  determine whether access stratum conditions are good or bad after expiration of the first timer; and
  re-establish and/or upgrade the PS RAB if access stratum conditions are good after expiration of the first timer;
wherein if access stratum conditions are bad, the program instructions are further executable to:
  determine whether or not the buffered packet data has quality of service (QoS) requirements;
  if the buffered packet data does not have QoS requirements, wait a lesser amount of time of a length of a second timer or until access stratum conditions are determined to be good, wherein if access stratum conditions are determined to be good the PS RAB is re-established and/or upgraded and the buffered packet data is transmitted via the PS RAB, wherein if the second timer expires the buffered packet data is discarded and one or more upper layer entities are informed that the buffered packet data has been discarded; and
  if the buffered packet data does have QoS requirements, wait a lesser amount of time of a length of a third timer or until access stratum conditions are determined to be good, wherein upon expiration of the third timer or if access stratum conditions are determined to be good the PS RAB is re-established and/or upgraded and the buffered packet data is transmitted via the PS RAB, wherein the length of the third timer is shorter than the length of the second timer.

19. A method for operating a wireless user equipment (UE) device, the method comprising:
establishing a multiple radio bearer call via a wireless link with a network, the call having a circuit-switched radio bearer component and a packet-switched radio bearer component;
detecting one or more conditions indicating that access stratum conditions are poor, wherein the UE device has packet data to send to the network when the one or more conditions are detected;
determining a Quality of Service (QoS) level of the packet data;
selecting a buffer timer value for the packet data based at least in part on the QoS level of the packet data; and
buffering the packet data until the earlier of expiration of the buffer timer or detection of one or more conditions indicating that access stratum conditions are good based on detecting the one or more conditions indicating that access stratum conditions are poor and based on the QoS level of the packet data.

20. The method of claim 19, wherein the one or more conditions indicating that access stratum conditions are poor comprise one or more of:

the packet-switched radio bearer component is released by the network;

the packet-switched radio bearer component is non-data-bearing;

UE device radio transmissions have had a maximum power level for at least a first amount of time;

transmit power commands received from the network have requested increased transmit power for at least a second amount of time; or UE device attempts to respond to network status polls have been unsuccessful for at least a third amount of time.

\* \* \* \* \*